(12) United States Patent
Suarez

(10) Patent No.: US 9,804,258 B2
(45) Date of Patent: Oct. 31, 2017

(54) SURFACE NON-UNIFORMITY DETERMINATION WITH RADIO WAVES

(71) Applicant: The United States of America, as represented by the Secretary of the Army, Washington, DC (US)

(72) Inventor: John Suarez, Brooklyn, NY (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 318 days.

(21) Appl. No.: 14/633,814

(22) Filed: Feb. 27, 2015

(65) Prior Publication Data

US 2016/0252613 A1 Sep. 1, 2016

(51) Int. Cl.
| | |
|---|---|
| *G01S 13/94* | (2006.01) |
| *G01S 7/41* | (2006.01) |
| *G01S 13/87* | (2006.01) |
| *G01S 13/93* | (2006.01) |

(52) U.S. Cl.
CPC ............. *G01S 7/412* (2013.01); *G01S 13/87* (2013.01); *G01S 13/931* (2013.01); *G01S 2013/9375* (2013.01)

(58) Field of Classification Search
CPC ................... G01S 13/87; G01S 13/931; G01S 2013/9375; G01S 7/412
USPC .......................................................... 342/70
See application file for complete search history.

(56) References Cited

U.S. PATENT DOCUMENTS

| | | | |
|---|---|---|---|
| 2006/0017807 A1 | 1/2006 | Lee et al. | |
| 2009/0051581 A1* | 2/2009 | Hatono | G01S 13/10 342/33 |
| 2010/0097456 A1* | 4/2010 | Zhang | B60W 30/09 348/119 |
| 2010/0121577 A1* | 5/2010 | Zhang | G06K 9/00805 701/301 |
| 2011/0291877 A1* | 12/2011 | Habboosh | G01S 13/10 342/159 |
| 2013/0038484 A1* | 2/2013 | Ohkado | G01S 13/345 342/70 |
| 2013/0096731 A1 | 4/2013 | Tamari et al. | |
| 2013/0250046 A1 | 9/2013 | Schofield et al. | |
| 2014/0104424 A1 | 4/2014 | Zhang et al. | |
| 2015/0168546 A1* | 6/2015 | Nakagawa | G01S 7/282 342/21 |

(Continued)

OTHER PUBLICATIONS

Balakuntala et al.; An Intelligent System to Detect, Avoid and Maintain Potholes: A Graph Theoretic Approach; arxiv.org/pdf/1305.5522; Accessed on Dec. 15, 2014.

(Continued)

*Primary Examiner* — Timothy A Brainard
(74) *Attorney, Agent, or Firm* — Ronald Krosky; Azza Jayaprakash

(57) ABSTRACT

Various embodiments that pertain to surface non-uniformity detection through use of radio waves are described. A vehicle can transmit radio waves to an area the vehicle is traveling to, such as a road in front of an automobile. The automobile can receive and process returned radio waves to determine if the road has a non-uniformity, such as a significant pothole or speed bump. If the road has the non-uniformity, then a driver of the automobile can be alerted so the driver can decide if evasive action should be taken and take such action if appropriate.

21 Claims, 14 Drawing Sheets

(56) References Cited

U.S. PATENT DOCUMENTS

2015/0212198 A1* 7/2015 Nishio .................... G01S 7/415
342/385
2015/0336546 A1* 11/2015 Al-Zahrani ............ G08G 1/165
701/93

OTHER PUBLICATIONS

Rode, et al.; Pothole Detection and Warning System using Wireless Sensor Networks; http://www.ee.washington.edu/research/nsl/aar-cps/PrakharGoyal-20081021025613.pdf; Accessed on Dec. 15, 2014.

* cited by examiner

SURFACE NON-UNIFORMITY DETERMINATION WITH RADIO WAVES

GOVERNMENT INTEREST

The innovation described herein may be manufactured, used, imported, sold, and licensed by or for the Government of the United States of America without the payment of any royalty thereon or therefor.

BACKGROUND

While driving an automobile, a driver can strive to have as smooth of a ride as possible. To achieve such a ride, the driver can select a route with roads that are better maintained than alternative routes. However, even the route with the better maintained roads can have road non-uniformities that result from use, such as potholes, or result from design, such as a speed bump. The driver can attempt to avoid or minimize impact of these non-uniformities, such as by slowing down when seeing approaching the speed bump. If visibility is poor, then the driver may not be able to avoid or minimize impact of the non-uniformities on his or her own.

SUMMARY

In one embodiment, a system comprises a transmission component, a reception component, a comparison component, and a determination component. The transmission component can configured to transmit a transmission radio wave from a vehicle toward a surface upon which the vehicle is travelling. The reception component can be configured to receive a reflected radio wave at the vehicle from the surface, the reflected radio wave is a reflection of the transmission radio wave off the surface. The comparison component configured to compare the reflected radio wave against the transmission radio wave to produce a comparison result. The determination can be component configured to determine if the surface has a non-uniformity through use of the comparison result. The transmission component, the reception component, the comparison component, the determination component, or a combination thereof can be implemented, at least in part, by way of non-software.

In one embodiment, a method is performed, at least in part, by a vehicle while traveling. The method comprises comparing a transmitted wave of a single transmission wavelength against a reflected wave to produce a comparison conclusion and determining if a surface has a non-uniformity through use of the comparison conclusion. The transmitted wave can be transmitted from the vehicle to the surface and the reflected wave can be reflected from the surface to the vehicle.

In one embodiment, a method can be performed, at least in part, by a processor associated with a vehicle. The method comprises comparing a first reflected radio wave against a second reflected radio wave to produce a comparison outcome and determining if a surface has a non-uniformity through use of the comparison outcome. The first transmitted radio wave of a first wavelength can be transmitted from the vehicle to the surface and the first reflected radio wave can be the first transmitted radio wave reflected from the surface to the vehicle, The second transmitted radio wave of a second wavelength different from the first wavelength can be transmitted from the vehicle to the surface and the second reflected radio wave can be the second transmitted radio wave reflected from the surface to the vehicle.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1A:
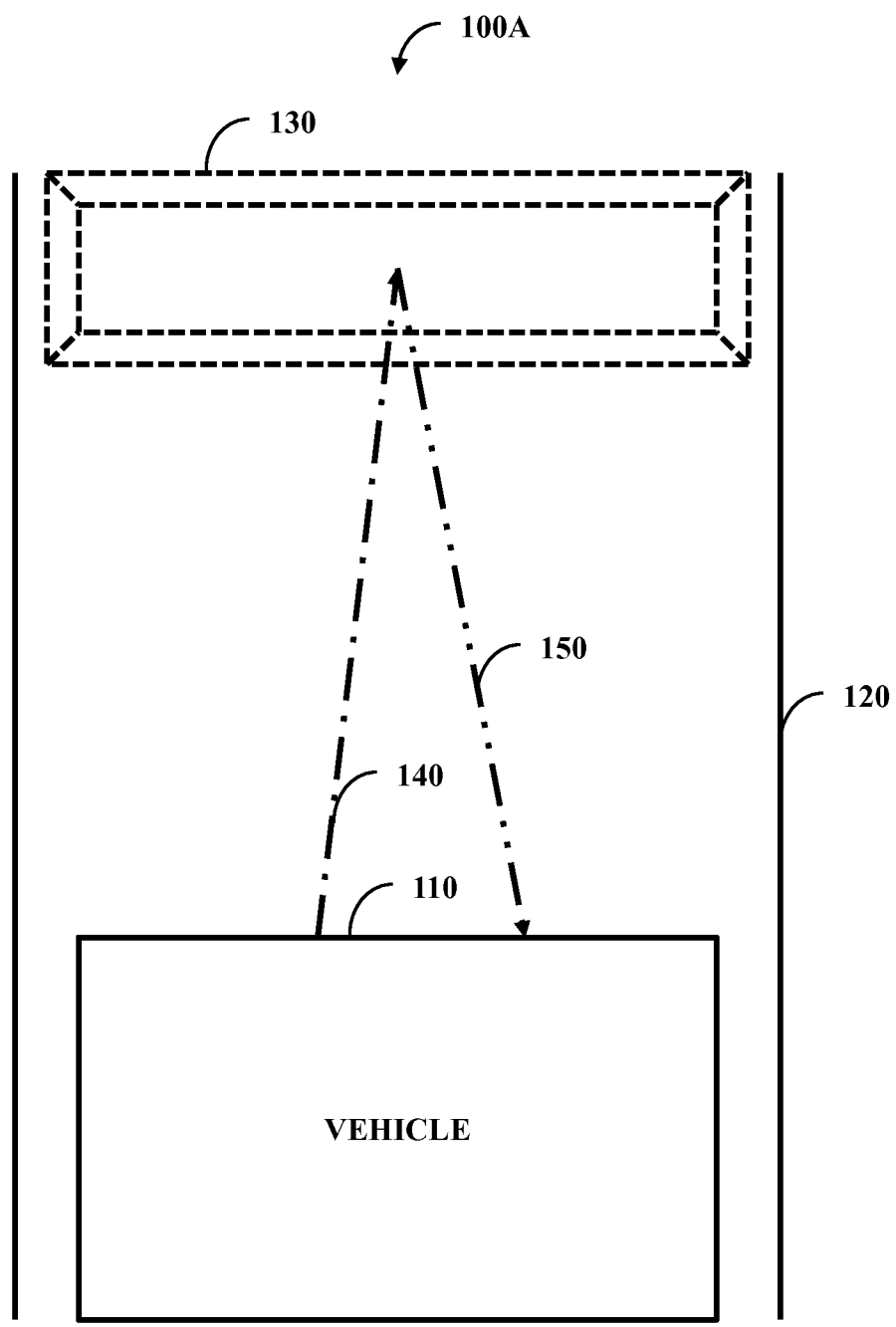
FIGS. 1A-1C illustrates three embodiments of a driving environment.

In one embodiment, an automobile can travel on a road. The road may have non-uniformities such as a change in surface type, a pothole, or a speed bump. In good visibility while attentively driving, a driver of the automobile can see these non-uniformities and respond appropriately such as by swerving or slowing down. However, visibility may be poor, the drive may not be driving attentively, or another circumstance may prevent the driver from seeing and in turn responding to the non-uniformity in an appropriate amount of time.

To improve driving, radio waves can be sent from the automobile to the road ahead. The automobile can receive reflections of the radio waves and process those reflections to determine if a non-uniformity exists. If the non-uniformity does exist, then the driver can be altered.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

Figure 1B:
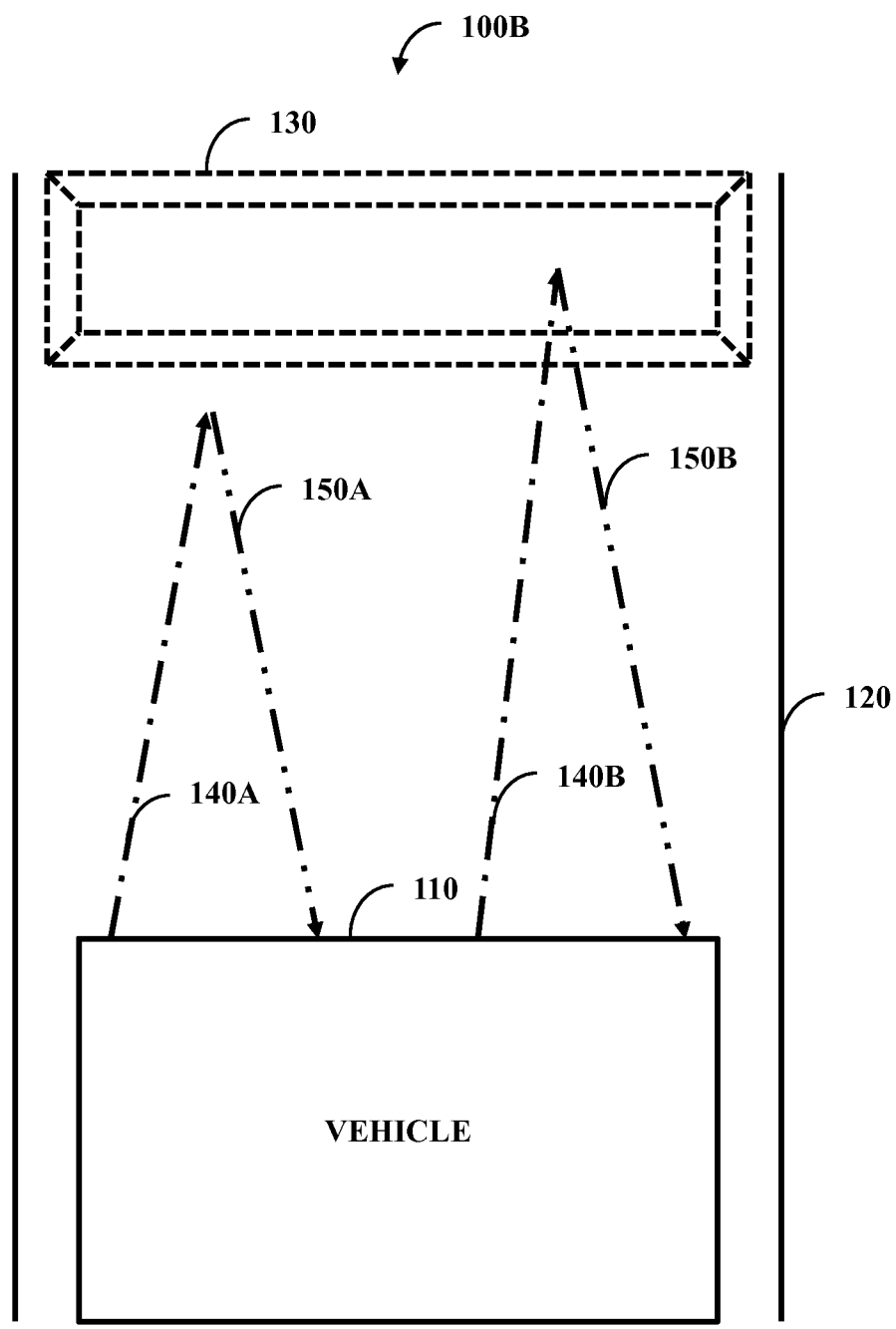
Figure 1C:
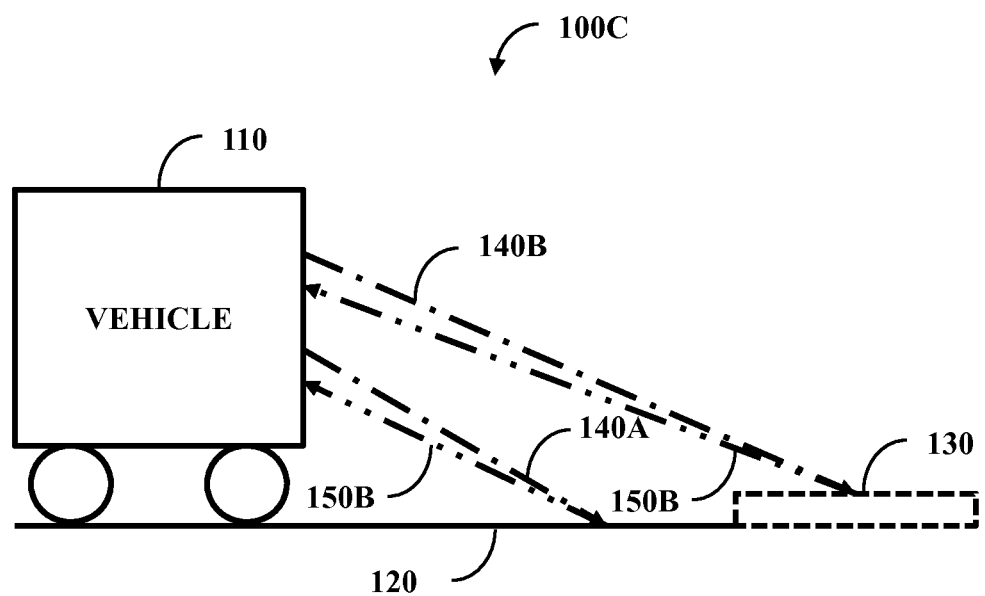

FIGS. 1A-1C illustrates three embodiments of a driving environment 100A-100C. A vehicle 110 (e.g., automobile, motorcycle, boat, bicycle, etc.) can drive on a surface 120 (e.g., paved road, dirt road, water, etc.). The surface 120 can have a non-uniformity 130 (e.g., speed bump, pothole, ice and/or black ice, wave, etc.). The non-uniformity 130 can also be a change in surface type, such as from a concrete road to an asphalt road. If the vehicle 110 travels over the non-uniformity 130 at all, travels over the non-uniformity 130 at an undesirable speed (e.g., too fast), travels over the non-uniformity 130 at an undesirable angle, etc., then a negative outcome can occur. Examples of the negative outcome can include one or more disruptions for the driver, injury to the driver, damage to the vehicle 110, harm to the surface 120, or destruction of the non-uniformity 130.

To try to minimize and/or eliminate the negative outcome, the vehicle 110 can transmit a transmission radio wave 140 to the surface 120. The transmission radio wave 140 can be transmitted directly ahead of the vehicle 110 toward a direction of travel for the vehicle 110. The transmission radio wave 140 can impact the surface 120 and be reflected back as a reflected radio wave 150 as illustrated in FIG. 1A. The transmission radio wave 140 can be a singular wave that transmits to a singular point as illustrated in FIG. 1A as well as be a non-singular wave as illustrated in FIGS. 1B and 1C (above view in FIG. 1B and side view in FIG. 1C).

With the singular wave, the transmission wave 140 is sent out to a single location and the reflected wave 150 is returned as an echo derived from the transmitted wave's reflection off the surface 120. In one example, the reflected wave 150 can be subtracted from the transmission wave 140, or vice versa, and the difference can be used as a baseline from which the non-uniformity is determined. The transmission wave 140 can be continuously transmitted and in turn a reflected wave 150 can be continuously received with differences being calculated. If a discrepancy exists between differences, then an inference can be drawn that the non-uniformity 130 exists.

With the non-singular wave, multiple transmission waves, such as two transmission waves 140A and 140B, can be transmitted to different locations of the surface 120 and at least some of these waves can be reflected back, such as the reflected waves 150A and 150B. These transmission waves 140A and 140B can be of the same frequency or be of different frequencies. The transmission waves 140A and 140B can be aimed to different parts of the surface (e.g., differing along the x-axis and/or differing along the y-axis) and reflections of these waves can be received by the vehicle 110. The vehicle 110 can compare these reflections against one another to determine existence of the non-uniformity 130 on the surface 120.

Aspects disclosed herein can relate to the field of radio-wave scanning, detection, and measurement. In accordance with these aspects, radio waves can be applied to determine, from a safe distance, a presence of the non-uniformity 130 in the surface 120. The non-uniformity 130 can be due to, for example, terrain, debris, or an intentionally-placed object. Aspects disclosed herein can lend themselves to military and commercial applications. One possible military application is detection of a mine that is directly ahead of an approaching vehicle. One possible commercial application is for the automotive industry—as an after-market or built-in module for detecting potholes. In either case, aspects could be used to detect the non-uniformity 130 of the surface 120 ahead of the vehicle 110 and notify the occupant of the non-uniformity 130 through use of the transmission radio wave 140.

Figure 2:
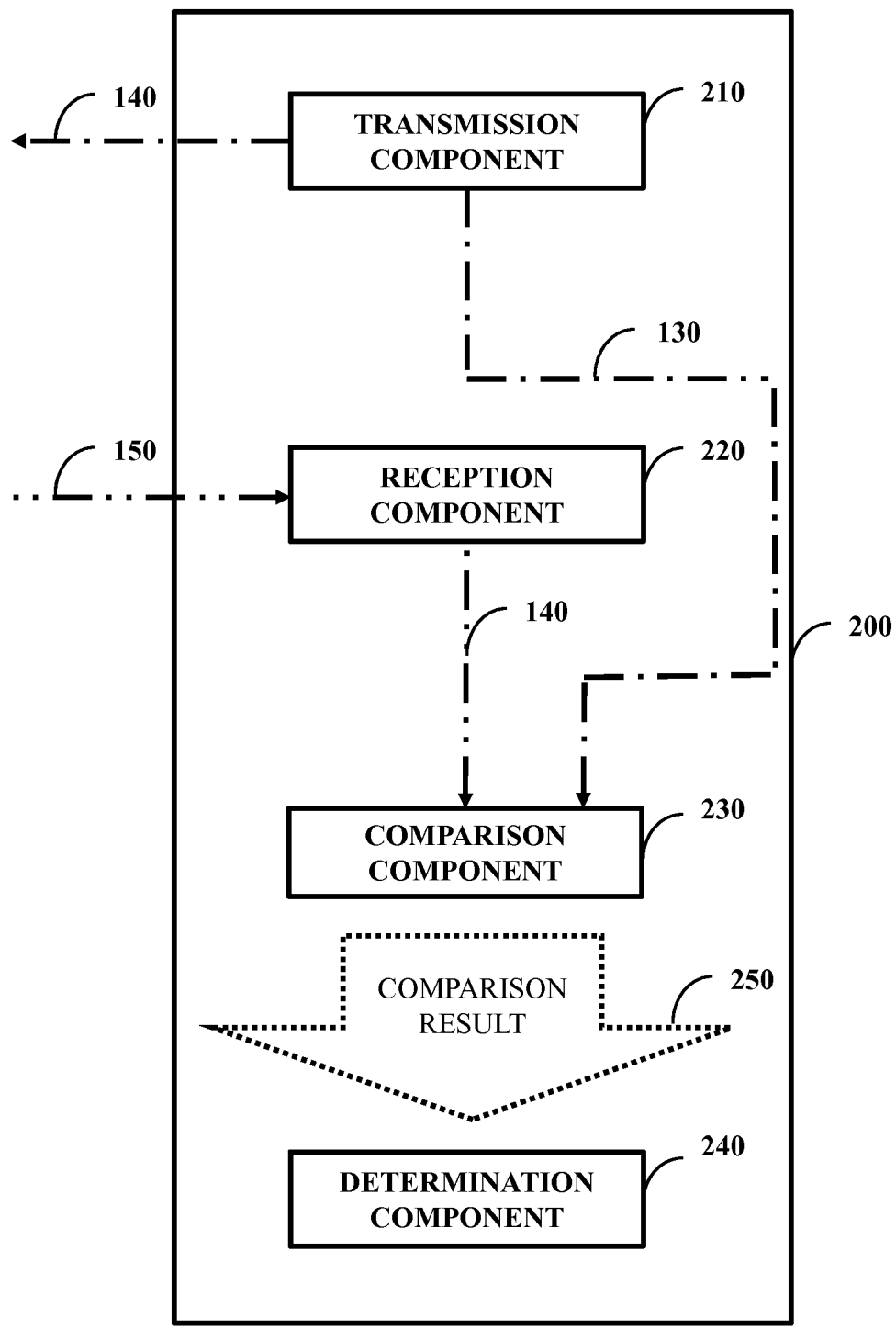
FIG. 2 illustrates one embodiment of a system comprising a transmission component, a reception component, a comparison component, and a determination component.

FIG. 2 illustrates one embodiment of a system 200 comprising a transmission component 210, a reception component 220, a comparison component 230, and a determination component 240. The transmission component 210 can be configured to transmit the transmission radio wave 140 (or non-radio wave) from the vehicle 110 of FIG. 1 (meaning at least one of FIGS. 1A-1C) toward the surface 120 of FIG. 1 upon which the vehicle 110 of FIG. 1 is travelling. The transmission component 210 can comprise an antenna used to transmit the transmission radio wave 140.

The reception component 220 can be configured to receive the reflected radio wave 150 (or non-radio wave) at the vehicle 110 of FIG. 1 from the surface 120 of FIG. 1. The reflected radio wave 150 is a reflection of the transmission radio wave 140 off the surface 120 of FIG. 1. In one embodiment, the reception component 220 uses the antenna used by the transmission component 210 for reception.

The comparison component 230 can be configured to compare the reflected radio wave 150 against the transmission radio wave 140 to produce a comparison result 250. The comparison component 230 can compensate for a difference between the waves 140 and 150 that is not based on the non-uniformity 130 of FIG. 1 and/or the surface 120 of FIG. 1. Examples of this can include compensation for movement of the vehicle 110 of FIG. 1, absorption by the surface 120 of FIG. 1, and/or interference. Compensation by the comparison component 230 can normalize the reflected wave 150 to the transmission wave 140 or vice versa. Once normalized, the comparison component 230 can make the comparison and produce the comparison result 250. In one example, this comparison can be finding differences between the transmission radio wave 140 and the reflected radio wave 150. These differences can be the comparison result 250 or no difference being found can be the comparison result 250.

The determination component 240 can be configured to determine if the surface 120 of FIG. 1 has the non-uniformity 130 of FIG. 1 through use of the comparison result 250. This can include determining if the non-uniformity 130 of FIG. 1 exists at all and/or if the non-uniformity 130 of FIG. 1 is a significant non-uniformity. In one example, if the comparison result 250 indicates that a difference exists then the determination component 240 can determine that the non-uniformity of FIG. 1 does exist. In this, the system 200 can use the transmission radio wave 140 and the reflected radio wave 150 to determine existence of the non-uniformity 130 of FIG. 1.

The reflected radio wave 150 may be a distorted version of the transmitted wave 140 due to the reflection off the surface 120. A physical relationship, such as a mapping, can exist between the transmission radio wave 140 and the reflected radio wave 150. This physical relationship can be mathematically reconstructed by the determination component 240 (e.g., when implemented as a microcontroller or digital-signal processing system) and this reconstruction can be used in determining existence of the non-uniformity 130 of FIG. 1. The non-uniformity 130 of FIG. 1 can be a deviation from a flat nature of the surface 120.

The transmission radio wave 140 can comprise a first wave (e.g., the transmission radio wave 140A of FIGS. 1B and 1C) and a second wave (e.g., the transmission radio wave 140B of FIGS. 1B and 1C) transmitted in a divergent arrangement (e.g., transmitted at the same frequency or at different frequencies) to the surface 120. This divergent arrangement can be such that the first wave makes contact with the surface 120 of FIG. 1 at a first location and the second wave makes contact with the surface 120 of FIG. 1 at a second location different from the first location. Similarly, the reflected radio wave 150 can comprise a first reflected wave (e.g., the reflected radio wave 150A of FIGS. 1B and 1C) that is a reflection of the first wave from the surface 120 of FIG. 1 and a second reflected wave (e.g., the reflected radio wave 150B of FIGS. 1B and 1C) that is a reflection of the second wave from the surface 120 of FIG. 1. The comparison component 230 can be configured to compare the first reflected wave against the second reflected wave to produce the comparison result 250.

As part of production of the comparison result 250, comparison of the reflected waves against one another can be used to establish sample points for the surface 120 of FIG. 1. In one example, five editions of the transmission wave 140 (e.g. waves 140A-B as well as three other waves) of equal wavelength can be emitted. Their reflections can be received and compared against one another. If the five editions have the same wavelength, then their reflections should be about equal to one another if the surface 120 of FIG. 1 is flat (e.g., equal except for interference due to longer distances). If one of the five reflections is not about equal to the other reflections, then the comparison result 250 can reflect this non-equal nature and/or indicate that due to this non-equal nature the non-uniformity 130 of FIG. 1 exists. This can also be done with different wavelengths with the comparison component 230 compensating for the different wavelengths (e.g., the five editions have different wave lengths from one another or three editions have one wavelength while the other two editions have a different wavelength).

Figure 3:
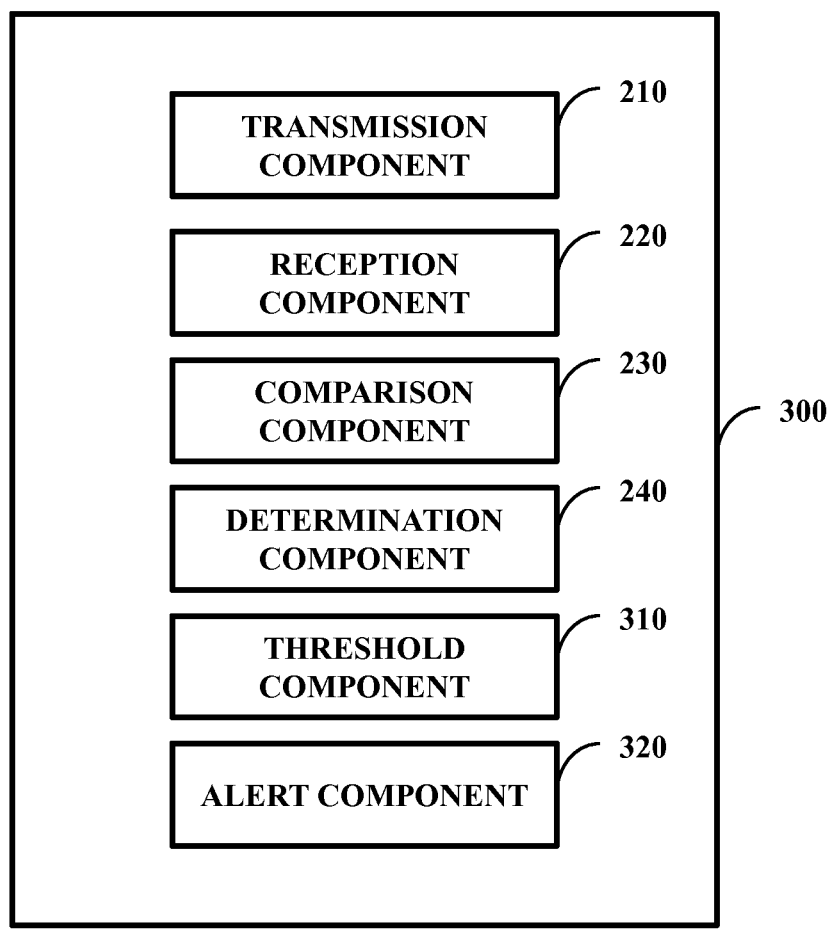
FIG. 3 illustrates one embodiment of a system comprising the transmission component, the reception component, the comparison component, the determination component, a threshold component, and an alert component.

FIG. 3 illustrates one embodiment of a system 300 comprising the transmission component 210, the reception component 220, the comparison component 230, the determination component 240, a threshold component 310, and an alert component 320. The threshold component 310 can be configured to determine if the non-uniformity 130 of FIG. 1 meets a threshold of significance. The alert component 320 can be configured to cause expression of an alert (e.g., flashing light and/or buzzer) to an occupant (e.g., driver or passenger) of the vehicle 110 of FIG. 1 when the non-uniformity 130 of FIG. 1 meets the threshold.

While a goal can be for the surface 120 of FIG. 1 to be completely uniform, the surface 120 can be produced with minor non-uniformities. These minor non-uniformities may be so small that they are unnoticeable to the occupant and/or have little impact on the vehicle 110 of FIG. 1. It can be irritating to the occupant to have frequent alerts and/or cause the occupant when driving to start to ignore alerts that can be important. The system 300 can function such that the occupant is alerted to significant non-uniformities while not being alerted to insignificant non-uniformities.

The non-uniformity 130 of FIG. 1 can be given a number (hereafter referred to as non-uniformity number) by the threshold component 310. Examples that can be used in assigning this number can include peak height of the non-uniformity 130 of FIG. 1, size of the non-uniformity, or speed of the vehicle 110 of FIG. 1 (that infers a likely impact of the non-uniformity 130 of FIG. 1 on the occupant). The threshold can also be a number and the threshold component 310 can compare the threshold against the non-uniformity number. If the non-uniformity number meets the threshold (e.g., equals the threshold or exceeds the threshold), then the alert component 320 can cause expression of the alert (e.g., one alert volume for existence of the non-uniformity 130 of FIG. 1 or the alert is louder the greater the deviation of the non-uniformity 130 of FIG. 1 from the surface 120 of FIG. 1). If the non-uniformity number does not meet the threshold (e.g., does not exceed the threshold), then the alert is not expressed by the alert component 320.

Figure 4:
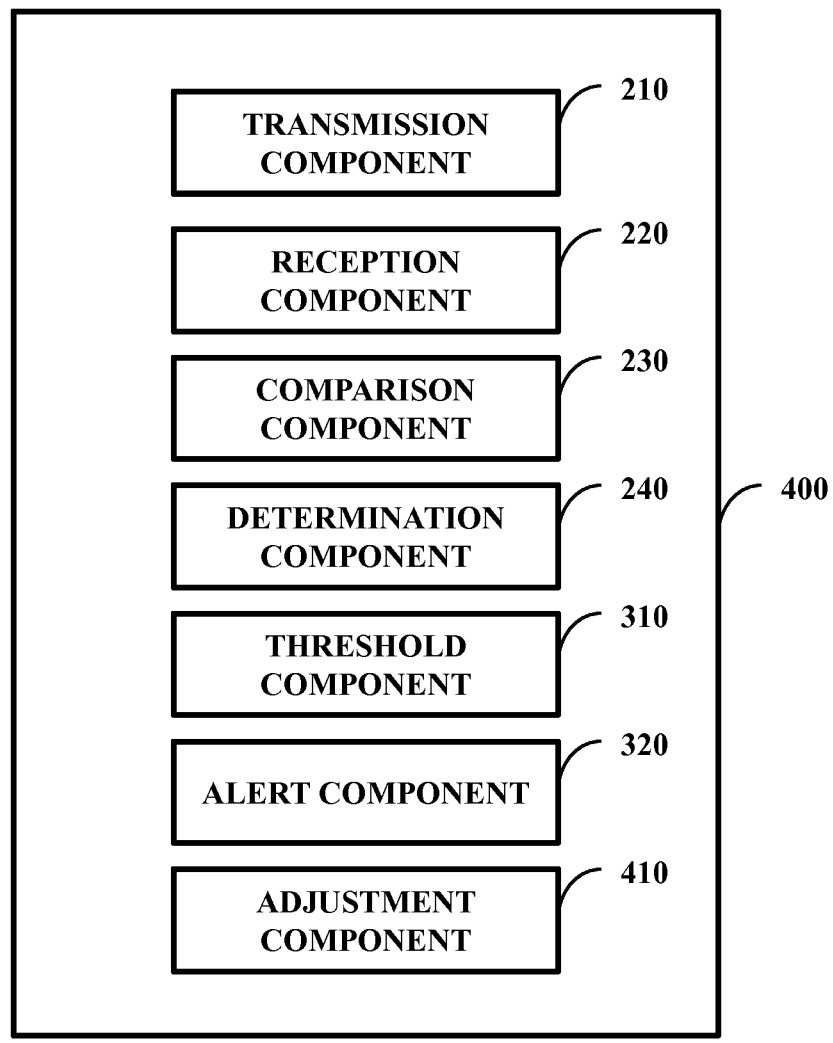
FIG. 4 illustrates one embodiment of a system comprising the transmission component, the reception component, the comparison component, the determination component, the threshold component, the alert component, and an adjustment component.

FIG. 4 illustrates one embodiment of a system 400 comprising the transmission component 210, the reception component 220, the comparison component 230, the determination component 240, the threshold component 310, the alert component 320, and an adjustment component 410. The adjustment component 410 can be configured to adjust the threshold of significance in response to an instruction from an occupant of the vehicle 110 of FIG. 1. The instruction can be entered into a graphical user interface of the vehicle 110 of FIG. 1, entered into a personal electronics device of the occupant, be spoken by the occupant and then received by the vehicle 110 of FIG. 1 as a voice command, etc.

This can allow for the occupant, such as the driver, to customize alters according his or her tolerance when driving. In one example, the driver can find too many false triggers causing alerts and in response the threshold should be changed. In one example, the initial threshold (e.g., plus-or-minus about two inches from about perfectly flat) can be set to a certain level as a factory preset. The driver, however, may find that the initial threshold is too sensitive and as such too many alerts are expressed. In view of this the driver can select for a new threshold (e.g., plus-or-minus about three inches from about perfectly flat). Therefore, the driver can select for the sensitivity to be lowered and this selection can cause the instruction that is from the occupant. Different driver and/or occupant profiles can be retained (e.g., by the vehicle 110 of FIG. 1) and loaded (e.g., when the adjustment component 410 identifies an appropriate profile).

In one embodiment, the adjustment component 410 can be configured to adjust the threshold of significance in response to something other than an instruction from the occupant. In one example, the alerts can be expressed at a variable volume such that the occupant can change the volume of the alerts. If the occupant keeps lowering the alert volume, the adjustment component 410 can infer (e.g., through employment of at least one artificial intelligence technique) that too many alerts are being sent and adjust the threshold.

Figure 5:
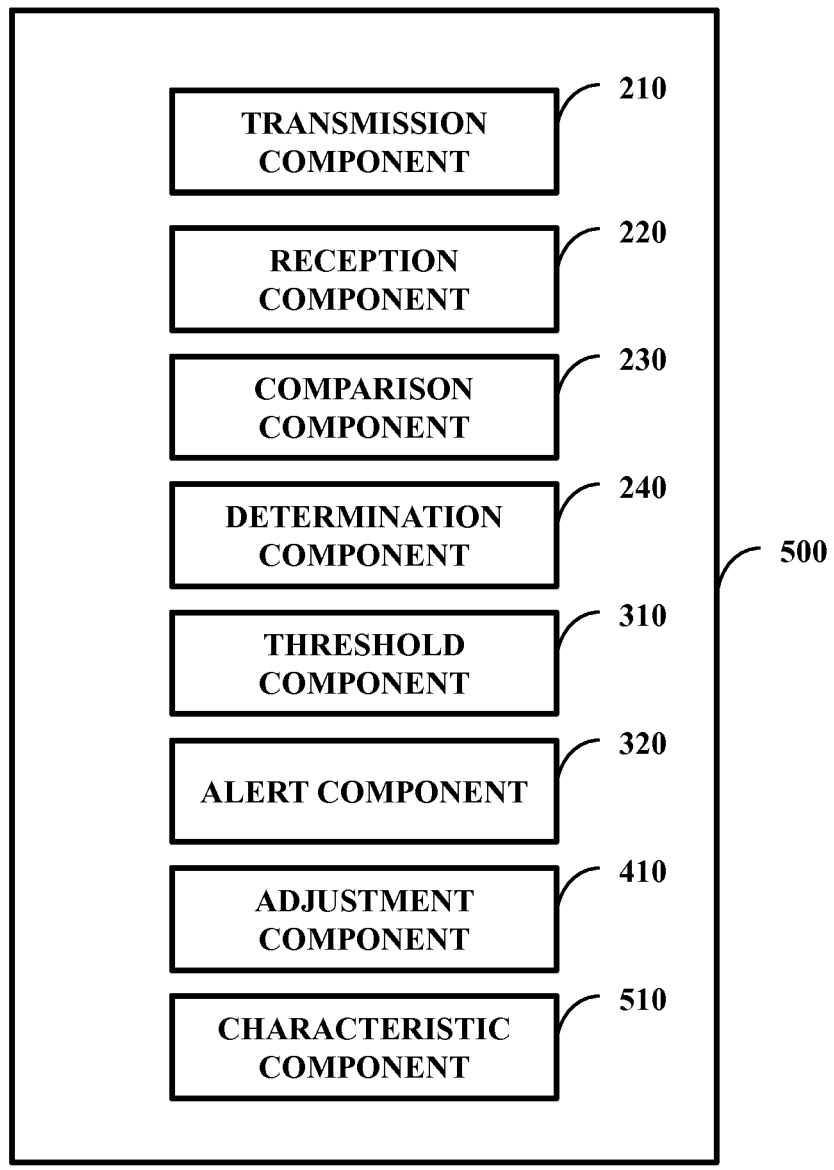
FIG. 5 illustrates one embodiment of a system comprising the transmission component, the reception component, the comparison component, the determination component, the threshold component, the alert component, the adjustment component, and a characteristic component.

FIG. 5 illustrates one embodiment of a system 500 comprising the transmission component 210, the reception component 220, the comparison component 230, the determination component 240, the threshold component 310, the alert component 320, the adjustment component 410, and a characteristic component 510. The characteristic component 510 can be configured to set a characteristic of the transmission radio wave based, at least in part, on the threshold of significance. The characteristic can be, in one example, the wavelength of the transmission radio wave 140 of FIG. 1. In this example, the lower the threshold and in turn the greater the sensitivity, then the shorter the wavelength.

The transmitted radio wave 140 of FIG. 1 can have well-defined characteristics that are measurably distorted by scattering and reflection. The wavelength of the transmitted radio wave 140 of FIG. 1 can be dependent on the dimension of the non-uniformities that the occupant wants to detect. If the occupant is travelling along smooth terrain, then occupant can calibrate the system 500 to be notified of deviations greater than a certain level (e.g., plus about 3 inches and minus about 2 inches). With this, a shorter wavelength for the transmitted radio wave 140 of FIG. 1 can be used. If the occupant would like to detect larger deviations (e.g., plus-or-minus about 4 inches), then a longer wavelength for the transmitted radio wave 140 of FIG. 1 can be used. The transmitted radio wave 140 of FIG. 1 can be used to scan different kinds of non-uniformities (e.g., non-uniformities of different dimensions) using various transmission wavelengths. Further, the transmitted radio wave 140 of FIG. 1 can be used to scan different kinds of non-uniformities on different terrain types.

Figure 6:
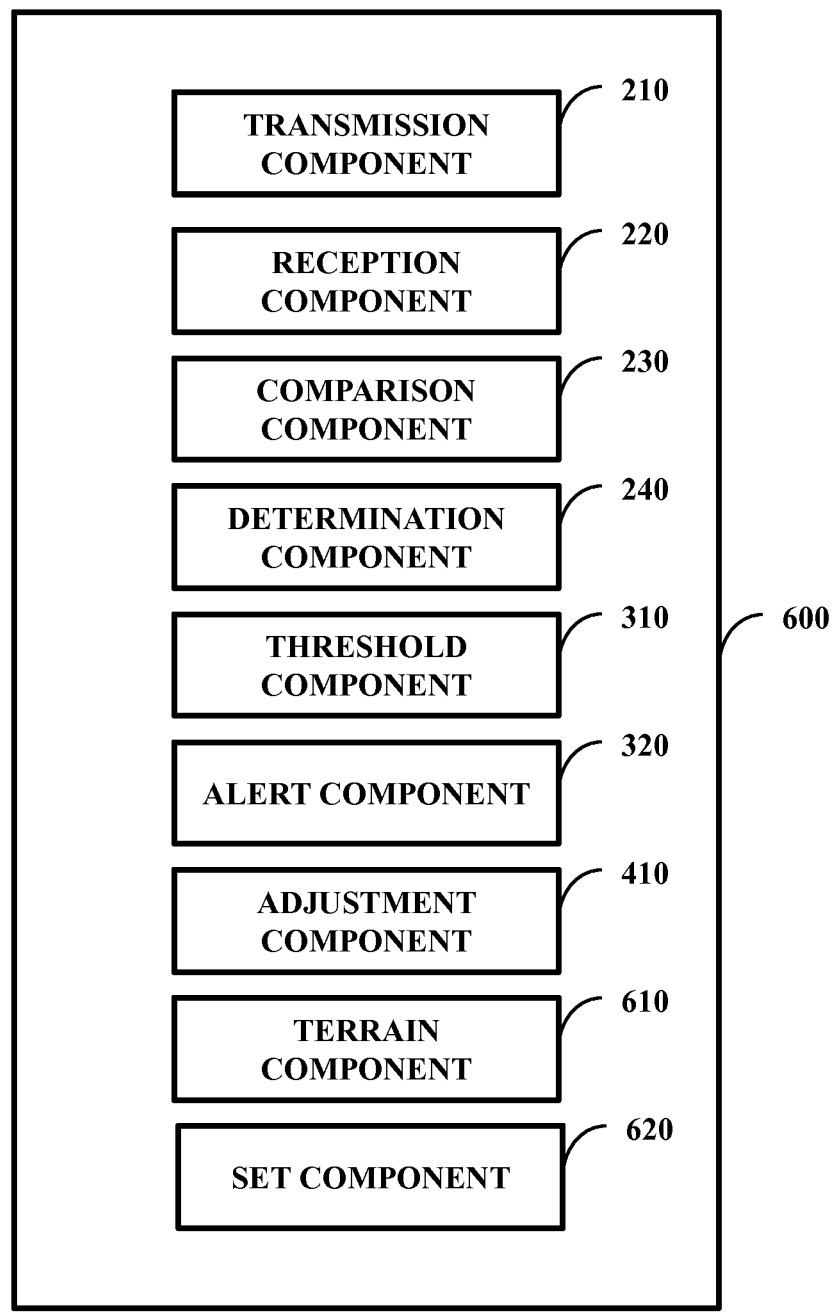
FIG. 6 illustrates one embodiment of a system comprising the transmission component, the reception component, the comparison component, the determination component, the threshold component, the alert component, the adjustment component, a terrain component, and a set component

FIG. 6 illustrates one embodiment of a system 600 comprising the transmission component 210, the reception component 220, the comparison component 230, the determination component 240, the threshold component 310, the alert component 320, the adjustment component 410, a terrain component 610, and a set component 620. The terrain component 610 can be configured to identify a terrain type of the surface 120 of FIG. 1. The set component 620 can be configured to set the threshold based, at least in part, on the terrain type.

Terrain type can cause differences in surface uniformity. An asphalt paved road is typically smoother than a gravel road. Having one threshold applying to both these roads may lead to undesirable results for at least one of the surfaces. Therefore, the terrain component 610 and set component 620 can function to give an appropriate value for the threshold based on the terrain type. Additionally, terrain type can be, for example, based on natural configuration (e.g., sand while on a beach or grass is the surface) and/or weather (e.g., snow and ice on a road causing the snow, ice, and pavement to be the surface 120 of FIG. 1)

The terrain component 610 can identify the terrain through various manners. In one example, the terrain component 610 can process the reflected radio waves 150A and 150B of FIG. 1. The terrain component 610 can compare these waves together and determining if the surface is a rough type or a smooth type. One threshold can be set for the rough type and a different threshold can be set for the smooth type. In one example, the terrain component 610 can access a map database that includes terrain information (e.g., expressly includes the terrain information or includes photographs from which the terrain component 610 can ascertain the terrain type (e.g., the exact terrain type or a terrain classification)). In one example, the occupant can input the terrain type into the graphical user interface and the terrain component 610 can read this input for the identification.

Figure 7:
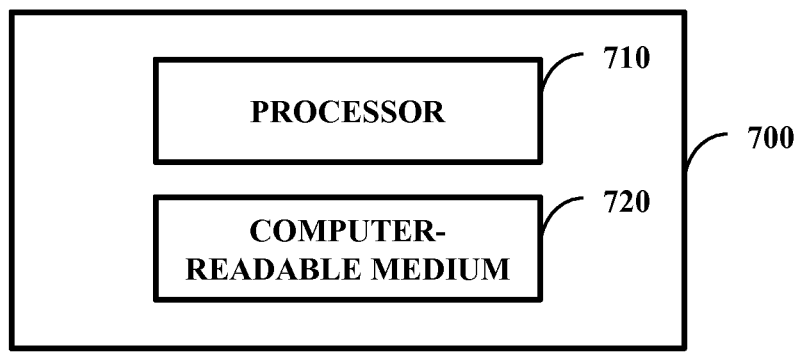
FIG. 7 illustrates one embodiment of a system comprising a processor and a non-transitory computer-readable medium.

FIG. 7 illustrates one embodiment of a system 700 comprising a processor 710 and a non-transitory computer-readable medium 720. The processor 710 can function as a microprocessor and/or the system 700 can function as a digital-signal processing system and at least one of these can execute calculations to solve mathematical mapping between the transmitted radio wave 140 of FIG. 1 and the reflected radio wave 150 of FIG. 1. The system 700 can include a radio-frequency transmission component and radio-frequency reception component for transmission and reception of the radio waves 140 and 150, both of FIG. 1, respectively. The system 700 can receive calibration settings from the occupant for the threshold and retain those settings in the computer-readable medium 720.

In one embodiment, the computer-readable medium 720 is communicatively coupled to the processor 710 and stores a command set executable by the processor 710 to facilitate operation of at least one component disclosed herein (e.g., the comparison component 230 of FIG. 2). In one embodiment, at least one component disclosed herein (e.g., the determination component 240 of FIG. 2) can be implemented, at least in part, by way of non-software, such as implemented as hardware by way of the system 700. In one embodiment, the computer-readable medium 710 is configured to store processor-executable instructions that when executed by the processor 710 cause the processor 710 to perform a method disclosed herein (e.g., the methods 800-1300 addressed below).

Figure 8:
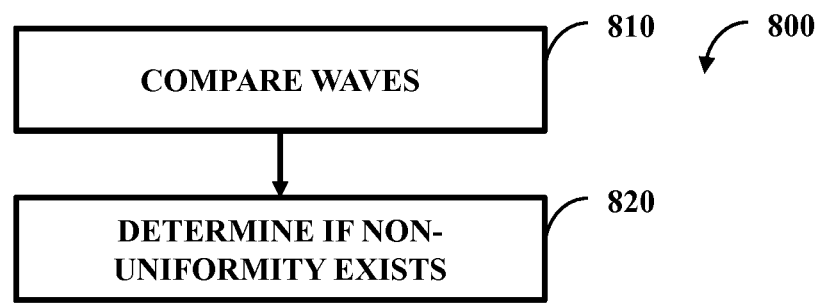
FIG. 8 illustrates one embodiment of a method comprising two actions.

FIG. 8 illustrates one embodiment of a method 800 comprising two actions 810-820. In one embodiment, the method 800 can function with regard to FIGS. 1B and 1C. At 810 the first reflected radio wave 150A of FIG. 1 can be compared against the second reflected radio wave 150B of FIG. 1 to produce a comparison outcome. The first reflected radio wave 150A of FIG. 1 can be the first transmitted radio wave 140A of FIG. 1 reflected from the surface 120 of FIG. 1 to the vehicle 110 of FIG. 1. Similarly, the second reflected radio wave 150B of FIG. 1 can be the second transmitted radio wave 140B of FIG. 1 reflected from the surface 120 of FIG. 1 to the vehicle 110 of FIG. 1. The transmitted radio waves 150A and 150B of FIG. 1 can be of the same wavelength or be of different wavelengths. Along with comparing reflected radio waves against one another 810 can include comparing the first transmitted radio wave 140A of FIG. 1 against the first reflected radio wave 150A of FIG. 1 to produce the comparison outcome and/or comparing the second transmitted radio wave 140B of FIG. 1 against the second reflected radio wave 150B to produce the comparison outcome. At 820 a determination can be made on if the surface 120 of FIG. 1 has the non-uniformity 130 of FIG. 1 through use of the comparison outcome.

In one embodiment, the method 800 can function with regard to FIG. 1A. At 810 the transmitted radio wave 140 of FIG. 1 (e.g., of a single transmission wavelength) that can be transmitted from the vehicle 110 of FIG. 1 to the surface 120 of FIG. 1 is compared against the reflected radio wave 150 of FIG. 1 that can be reflected from the surface 120 of FIG. 1 to the vehicle 110 of FIG. 1 to produce a comparison conclusion. At 820 there can be determining if the surface 120 of FIG. 1 has the non-uniformity 130 of FIG. 1 through use of the comparison conclusion.

Figure 9:
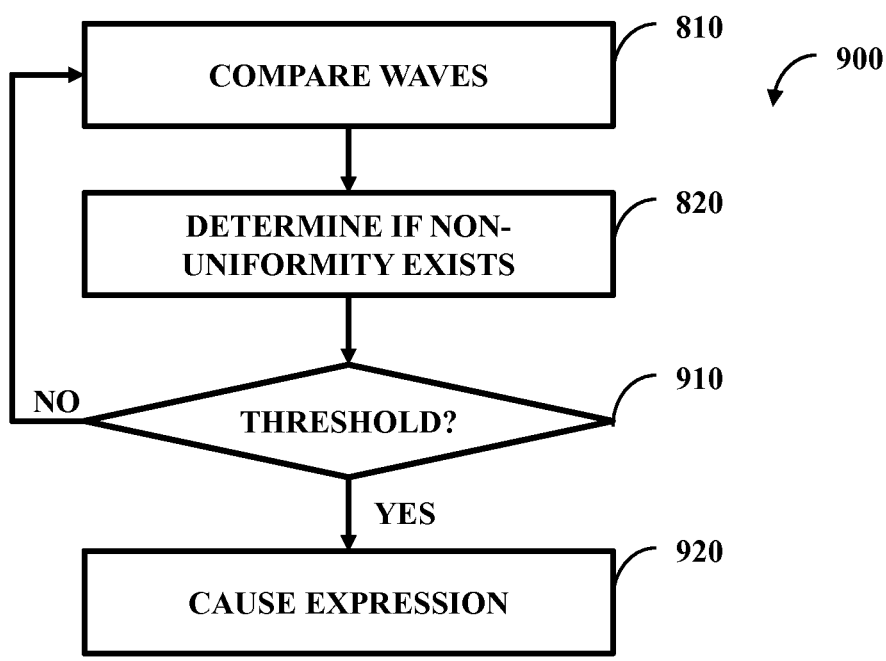
FIG. 9 illustrates one embodiment of a method comprising four actions.

FIG. 9 illustrates one embodiment of a method 900 comprising four actions 810-820 and 910-920. It can be determined, at 820, that the non-uniformity 130 of FIG. 1 exists, and then there can be, at 910, determining if the non-uniformity 130 of FIG. 1 meets a threshold of significance. When the non-uniformity 130 of FIG. 1 meets the threshold of significance the method 900 can proceed to 920 where causing expression of the alert to the occupant of the vehicle 110 of FIG. 1 occurs. When the non-uniformity does not meet the threshold of significance the method 900 can return to 810 to compare other waves.

Figure 10:
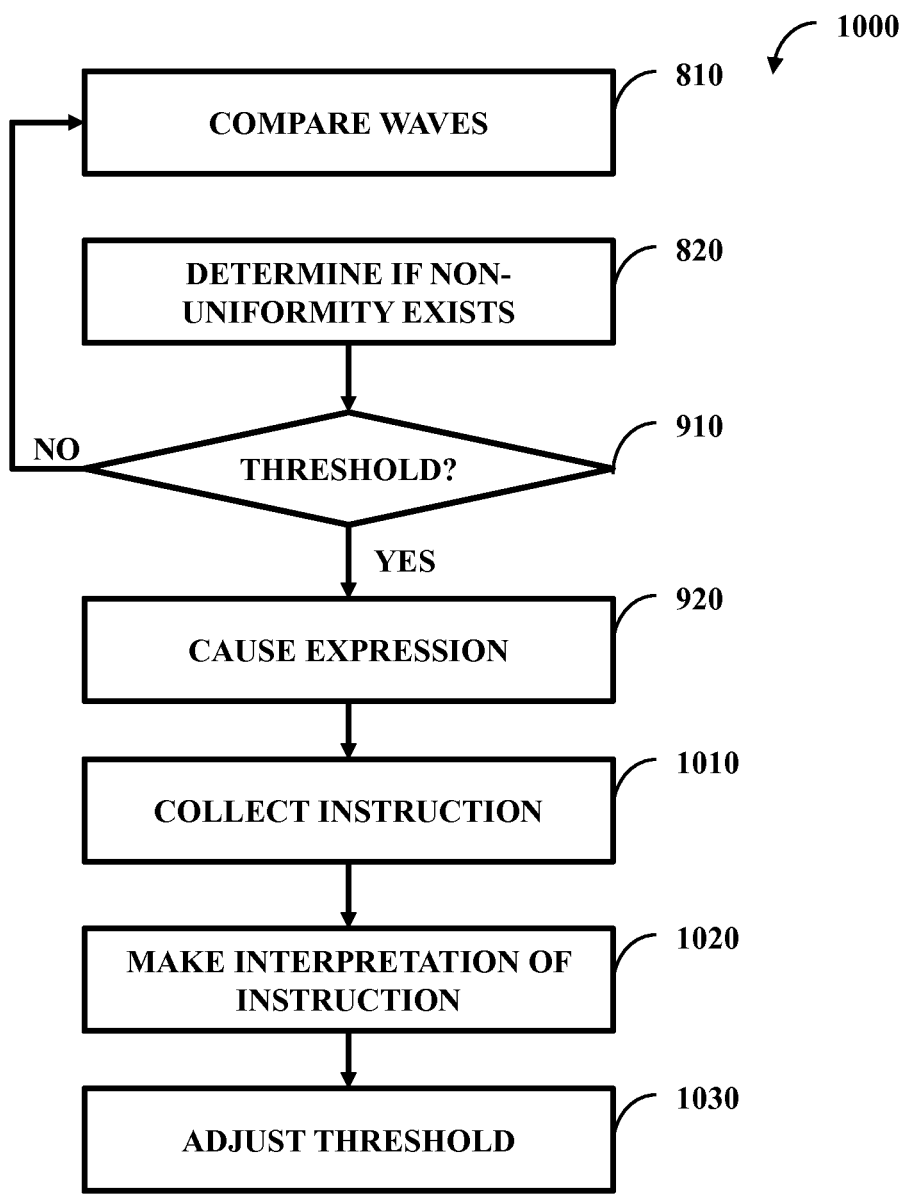
FIG. 10 illustrates one embodiment of a method comprising seven actions.

FIG. 10 illustrates one embodiment of a method 1000 comprising seven actions 810-820, 910-920, and 1010-1030. After the expression is caused at 920, an instruction can be sent that the threshold should change and this instruction can be collected at 1010. The instruction can be interpreted at 1020 and in accordance with this interpretation the threshold can be adjusted at 1030.

Figure 11:
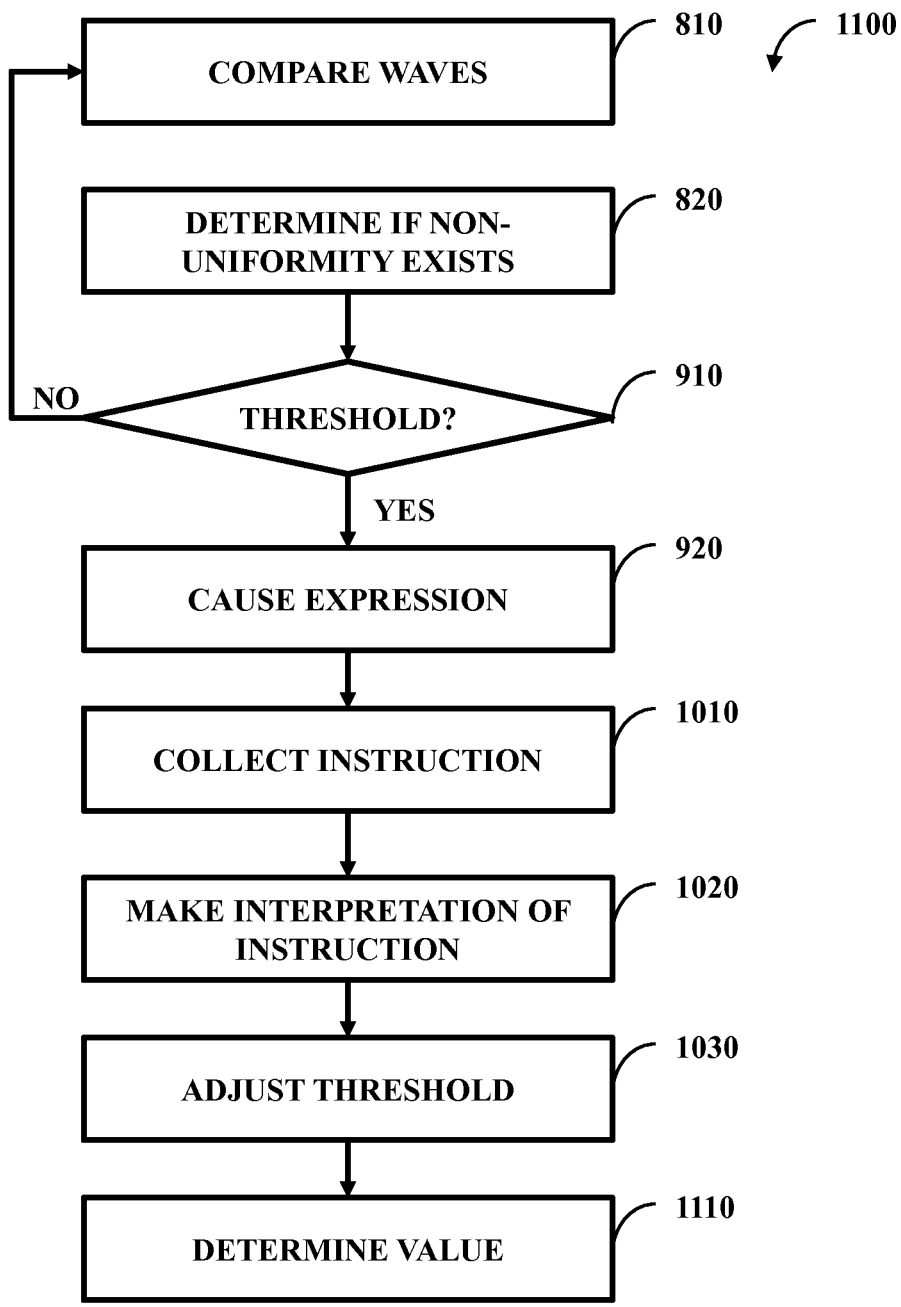
FIG. 11 illustrates one embodiment of a method comprising eight actions.

FIG. 11 illustrates one embodiment of a method 1100 comprising eight actions 810-820, 910-920, 1010-1030, and 1110. At 1110 there is determining a value of the single transmission wavelength. This determination can be based, at least in part, on the threshold after adjustment. The transmitted radio wave 140 of FIG. 1 can be transmitted from the vehicle 110 of FIG. 1 to the surface 120 of FIG. 1 with the value. This transmission can be part of the method 1100, such as part of the wave comparison 810.

While shown as being part of one seamless method 1100, actions 1010, 1020, 1130, and 1110 (as well as other actions disclosed herein) can function independently. In one example, the instruction can be produced and collected at 1010 before expression of the alert. In this example, the driver of the vehicle 110 of FIG. 1 can input the instruction (e.g., turn off the alerts entirely) upon purchasing a new vehicle. The instruction can be interpreted and the threshold can be adjusted to a value that is essentially infinity (interpreted by the vehicle 110 of FIG. 1 as infinity and as such the threshold cannot be met) at 1030 and/or the value can be set to zero such that the transmitted radio wave 140 of FIG. 1 is not transmitted.

Figure 12:
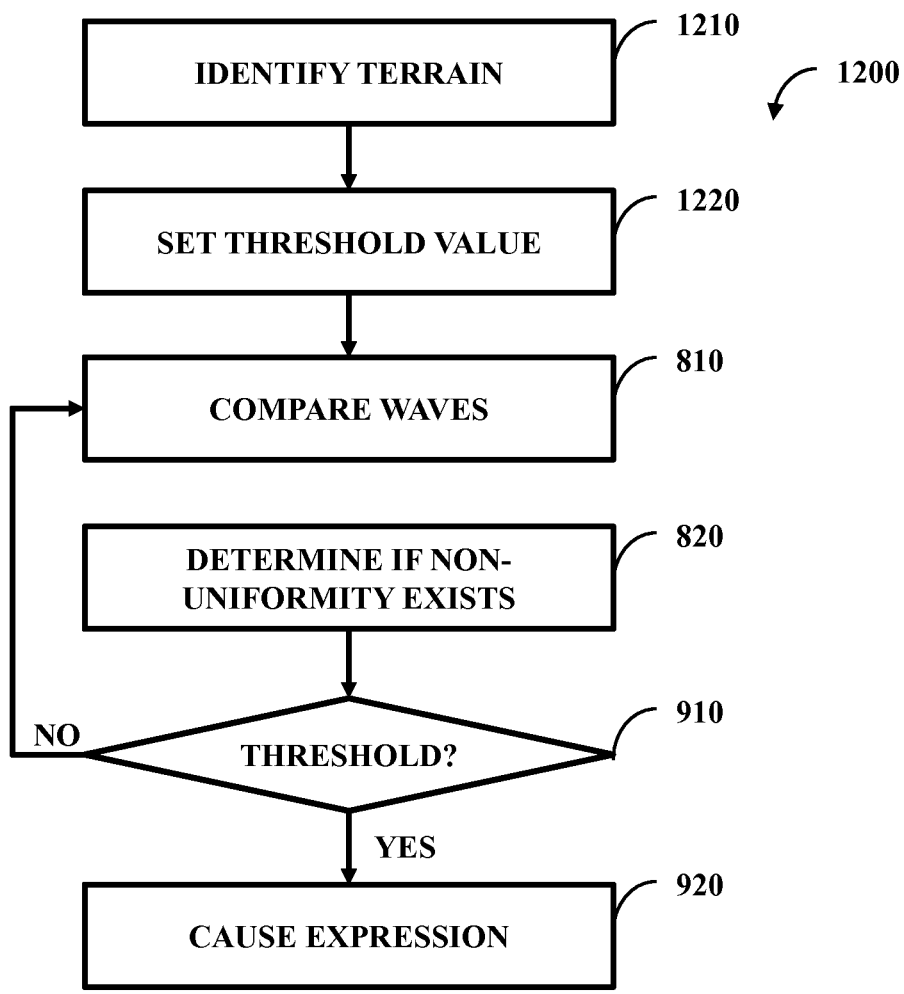
FIG. 12 illustrates one embodiment of a method comprising six actions.

FIG. 12 illustrates one embodiment of a method 1200 comprising six actions 810-820, 910-920, and 1210-1220. At 1210 the terrain type of the surface 120 of FIG. 1 can be identified. At 1220 the value of the threshold can be set based, at least in part, on the terrain type.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A system, comprising:
   a transmission component configured to transmit a transmission radio wave from a vehicle toward a surface upon which the vehicle is travelling;
   a reception component configured to receive a reflected radio wave at the vehicle from the surface, the reflected radio wave is a reflection of the transmission radio wave off the surface;
   a comparison component configured to compare the reflected radio wave against the transmission radio wave to produce a comparison result;
   a determination component configured to determine if the surface has a non-uniformity through use of the comparison result;
   a threshold component configured to determine if the non-uniformity meets a threshold of significance;
   an alert component configured to cause expression of an alert to an occupant of the vehicle when the non-uniformity meets the threshold of significance;
   an adjustment component configured to adjust the threshold of significance in response to an instruction from an occupant of the vehicle; and
   a characteristic component configured to set a characteristic of the transmission radio wave based, at least in part, on the threshold of significance,
   where the transmission component, the reception component, the comparison component, the determination component, the threshold component, the alert component, the adjustment component, the characteristic component, or a combination thereof is implemented, at least in part, by way of non-software.

2. The system of claim 1, comprising:
   a terrain component configured to identify a terrain type of the surface; and
   a set component configured to set the threshold of significance based, at least in part, on the terrain type.

3. The system of claim 1,
   where the transmission radio wave comprises a first wave and a second wave transmitted in a divergent arrangement to the surface such that the first wave makes contact with the surface at a first location and the second wave makes contact with the surface at a second location different from the first location,
   where the characteristic is applied to the first wave and the second wave, and
   where the reflected radio wave comprises a first reflected wave that is a reflection of the first wave from the surface and a second reflected wave that is a reflection of the second wave from the surface.

4. The system of claim 3, where the comparison component is configured to compare the first reflected wave against the second reflected wave to produce the comparison result.

5. The system of claim 3, where the first wave and the second wave are of the same wavelength.

6. The system of claim 5, comprising:
   a terrain component configured to identify a terrain type of the surface; and
   a set component configured to set the threshold of significance based, at least in part, on the terrain type.

7. The system of claim 3, where the first wave and the second wave are of different wavelengths.

8. The system of claim 7, comprising:
   a terrain component configured to identify a terrain type of the surface; and
   a set component configured to set the threshold of significance based, at least in part, on the terrain type.

9. The system of claim 1,
where the comparison component is configured to normalize the reflected radio wave to a normalized version of the reflected radio wave and configured to normalize the transmission radio wave to a normalized version of the transmission radio wave,
where the comparison component is configured to compare the normalized version of the reflected radio wave and the normalized version of the transmission radio wave to produce the comparison result, and
where the normalization compensates for a difference set between the reflected radio wave and the transmission radio wave not caused by the non-uniformity.

10. The system of claim 1,
where the alert component does not cause expression of the alert to the occupant of the vehicle when the non-uniformity does not meet the threshold of significance.

11. The system of claim 1,
where the vehicle is an automobile and
where the non-uniformity is such that the automobile is capable of driving over the non-uniformity.

12. The system of claim 1, comprising:
a selection component configured to make a selection of the alert from an alert set,
where the selection is based, at least in part, on an intensity of the non-uniformity.

13. The system of claim 1,
where the characteristic is a wavelength of the transmission radio wave and
where the wavelength corresponds to the threshold of significance such that the lower the threshold of significance, then the shorter the wavelength.

14. A method, performed, at least in part, by a vehicle while traveling, comprising:
identifying a terrain type of a surface;
setting a value of a threshold based, at least in part, on the terrain type;
comparing a transmitted wave of a simile transmission wavelength against a reflected wave to produce a comparison conclusion; and
determining if a surface has a non-uniformity through use of the comparison conclusion
determining if the non-uniformity meets the threshold; and
causing expression of an alert to an occupant of the vehicle when the non-uniformity meets the threshold,
where the transmitted wave is transmitted from the vehicle to the surface and
where the reflected wave is reflected from the surface to the vehicle.

15. The method of claim 14,
where the transmitted wave comprises a first wave and a second wave transmitted in a divergent arrangement such that the first wave makes contact with the surface at a first location and the second wave makes contact with the surface at a second location different from the first location and
where the reflected wave comprises a first reflected wave that is a reflection of the first wave from the surface and a second reflected wave that is a reflection of the second wave from the surface.

16. A method, performed, at least in part, by a processor associated with a vehicle, comprising:
comparing a first reflected radio wave against a second reflected radio wave to produce a comparison outcome;
determining if a surface has a non-uniformity through use of the comparison outcome;
determining if the non-uniformity meets a standard;
causing expression of an alert to an occupant of the vehicle when the non-uniformity meets the standard;
obtaining a command to change the standard;
making an interpretation of the command; and
adjusting the standard in accordance with the interpretation of the command,
where a first transmitted radio wave of a first wavelength is transmitted from the vehicle to the surface,
where the first reflected radio wave is the first transmitted radio wave reflected from the surface to the vehicle
where a second transmitted radio wave of a second wavelength different from the first wavelength is transmitted from the vehicle to the surface, and
where the second reflected radio wave is the second transmitted radio wave reflected from the surface to the vehicle.

17. The method of claim 16, comprising:
determining if a terrain type of the surface merits modification of the standard; and
modifying the standard if it is determined that modification is merited.

18. The method of claim 17, comprising:
comparing the first transmitted radio wave against the first reflected radio wave to produce the comparison outcome; and
comparing the second transmitted radio wave against the second reflected radio wave to produce the comparison outcome.

19. The method of claim 16,
where the command to change the standard is provided by an occupant of the vehicle.

20. The method of claim 16,
where the command to change the standard is provided by a component and
where the command is derived from a change in speed of the vehicle.

21. The method of claim 16,
where the command to change the standard is provided by a component and
where the command is supplied from a stored profile of the occupant.

* * * * *